June 9, 1925. 1,541,082
V. V. VEENSCHOTEN
VALVE
Filed Sept. 15, 1921
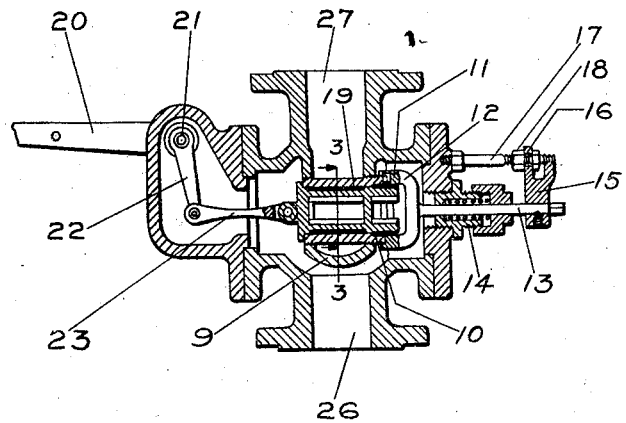
Fig. 1.
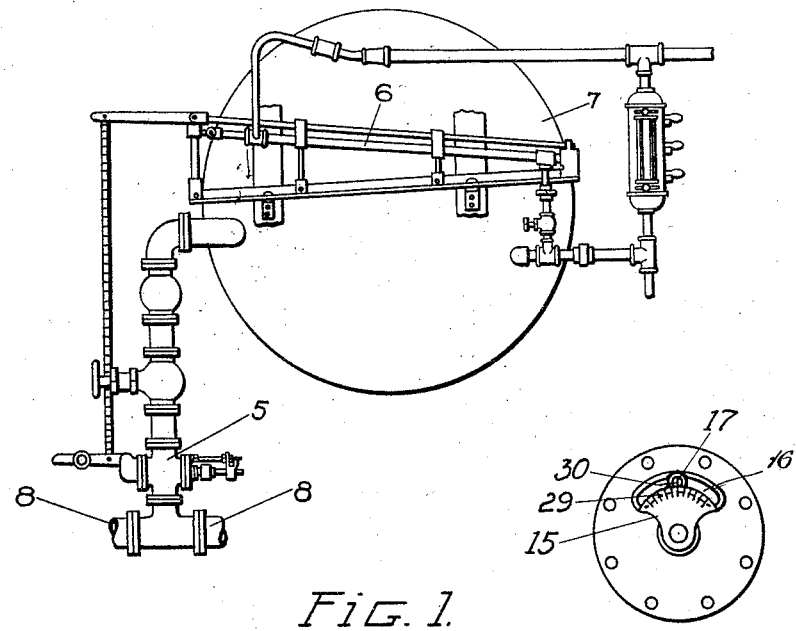
Fig. 4.
Fig. 3.
Fig. 2.
INVENTOR.
VINCENT V. VEENSCHOTEN.
BY: E. J. Andrews
ATTORNEY.

Patented June 9, 1925.

1,541,082

UNITED STATES PATENT OFFICE.

VINCENT V. VEENSCHOTEN, OF ERIE, PENNSYLVANIA, ASSIGNOR TO NORTHERN EQUIPMENT CO., OF ERIE, PENNSYLVANIA, A CORPORATION OF PENNSYLVANIA.

VALVE.

Application filed September 15, 1921. Serial No. 500,753.

*To all whom it may concern:*

Be it known that I, VINCENT VEENSCHOTEN, a citizen of the United States, residing at Erie, in the county of Erie and State of Pennsylvania, have invented certain new and useful Improvements in Valves, of which the following is a specification.

This invention relates to valves and particularly to feed-water valves for boilers in which the valves are controlled by feed-water regulators. It has for its object the production of a valve, the effective size of which can be adjusted without interfering with the operation of the valve or its control by means of the regulator or any other device.

It is obvious that the rate of flow of a fluid through a valve depends upon the magnitude of the opening through the valve as well as upon the fall in pressure through the valve; and, while the opening through the valve is ordinarily easily controlled so as to vary the flow of the fluid therethrough, yet it is often desired to control this opening otherwise during the normal operation of the valve, particularly when it is used as a feed-water valve for boilers. By the use of my adjustable valve variations in the size of the valve opening can be made without changing the valve itself and without in any way interfering with the automatic control of the valve.

As an example of the use of such a valve when a battery of similar boilers is used and supplied with water by a single pump, it is common to install similar feed-water valves. But, in such a case, the boiler most remote from the pump will require a larger opening through the feed-water valve, in order to supply feed-water at the same rate as the other boilers, as the drop in pressure through the remote valve will be less. And it is obvious that the pressure will depend upon the steam pressure of the boilers and other conditions that may vary from time to time. Hence, in such cases, it is desirable to be able to adjust the valve opening according to the particular needs of the boiler, either temporarily or permanently, irrespective of the control of the valve by the regulator.

Of the accompanying drawings Fig. 1 is an elevation, more or less diagrammatic, of a boiler and its feed-water system, the valve of which embodies features of my invention; Fig. 2 is a central sectional view of the valve; Fig. 3 is a section along the line 3—3 of Fig. 2; and Fig. 4 is an elevation of one end of the valve.

The feed-water valve 5 is operated in any ordinary manner by means of the feed-water regulator 6 which is of an ordinary type, and which is mounted substantially at the same elevation as the average water-level in the boiler 7. As the water-level in the boiler ascends or descends, the regulator 6 will control the opening of the valve 5 and will thus supply water to the boiler substantially according to its needs. Other boilers, not shown, may be associated with the boiler 7 and supplied with water from a common source by means of pipes 8.

The valve 5 comprises an inner partition 9 and has rotatably mounted in this partition a cylindrical valve-seat 10. I prefer to mount this seat in the partition by threading it in the partition as indicated, and I provide means for rotating the seat in the threads. Any suitable means for this purpose may be provided, but I prefer a ring 11, fixed rigidly to the end of the seat 10, having a yoke 12 to which is fixed a stem 13 which passes out of the casing of the valve through a stuffing-box 14. Fixed to the outer end of the stem is a quadrant 15, which has an elongated arcuate slot 16 on its outer end arranged for receiving a pin 17 which is fixed to the casing of the valve. By means of the quadrant 15 the stem 13 together with the valve seat can be rotated as desired, and by means of the lock-nuts 18 the seat can be locked in its adjusted position. A scale 29, with an index slot 30 in the pin 17, indicates the angular position of the seat.

Within the valve seat is mounted a valve plunger 19 which is non-rotatable but which is movable with reference to the seat. The plunger is arranged to be moved longitudinally in the seat by the feed-water regulator, by means of an arm 20 fixed to a spindle 21 which passes through a stuffing-box in the casing. The spindle has fixed thereto an arm 22, which, by means of a link 23 pivoted to the arm of the spindle, reciprocates the plunger in its seat in any ordinary manner.

The valve-seat has openings 24, and the valve plunger has openings 25 which are adapted to register with the openings 24 when the plunger and seat are in one relative position. As they are rotated relatively from this position, the openings are closed more or less, and are entirely closed upon rotating sufficiently. However, the opening through the partition 9, from the valve inlet 26 to the valve outlet 27, depends upon the longitudinal position of the plunger in the seat, as is common. Hence, the relative rotation of the seat and plunger is effective in varying the opening through the valve only when the plunger has been moved longitudinally in the seat sufficiently to open the ports through the partition 9.

As is common, the plunger 19 has partitions 28 which close the openings in the partition 9 of the valve when the plunger is in the valve closing position, Fig. 2; and the outer diameter of the plunger and inner diameter of the seat, in line with these partitions when the valve is closed is such as to prevent leakage. But elsewhere the diameter of the plunger is slightly decreased and of the seat is slightly increased, so as to reduce friction particularly when the valve is more or less open.

I claim as my invention:

1. A valve casing having a partition therein with two opposing openings in said partition, a cylindrical member having its ends threaded respectively into said openings, a cylindrical plunger slidably mounted into said member, means for reciprocating said plunger, and means for rotating said member.

2. A valve having a plunger and a seat, means for moving said plunger and seat relatively longitudinally, means for rotating said seat, and means for indicating the angular position of the seat.

In testimony whereof, I hereunto set my hand.

VINCENT V. VEENSCHOTEN.